United States Patent [19]

Davis et al.

[11] Patent Number: 4,839,628

[45] Date of Patent: Jun. 13, 1989

[54] PAGING RECEIVER HAVING SELECTIVELY PROTECTED REGIONS OF MEMORY

[75] Inventors: Walter L. Davis, Coral Springs; Mario A. Rivas, West Palm Beach, both of Fla.; Kenneth R. Burch; Vincent B. Deems, both of Austin, Tex.

[73] Assignee: Motorola, Inc., Schaumburg, Ill.

[21] Appl. No.: 141,802

[22] Filed: Jan. 11, 1988

[51] Int. Cl.$^4$ ............................................. G08B 3/10
[52] U.S. Cl. ............................. 340/311.1; 340/825.22; 340/825.44; 340/825.50
[58] Field of Search ............. 340/311.1, 825.44, 825.5, 340/825.15, 825.22; 380/3, 4, 23, 25

[56] References Cited

U.S. PATENT DOCUMENTS 4,211,919  7/1980  Ugon ................................. 235/487

FOREIGN PATENT DOCUMENTS

2068616  8/1981  United Kingdom .......... 340/825.44

Primary Examiner—Joseph A. Orsino, Jr.
Assistant Examiner—A. H. Chau
Attorney, Agent, or Firm—Philip P. Macnak; Vincent B. Ingrassia

[57] ABSTRACT

A paging receiver includes a nonvolatile memory which is readable for controlling the operation of the paging device and is capable of being partitioned into a plurality of regions. A protect means is also included for allowing modification to a selected region of the nonvolatile memory in response to an unlock signal. In a first embodiment, the unlock signal is externally applied to the paging receiver. In a second embodiment, the unlock signal is generated when a predetermined coded signal stored in the paging receiver matches a received coded signal. In a third embodiment, the protect means further includes a switch means to permit the selected region of memory to be modified while preventing other regions of memory to be modified.

26 Claims, 3 Drawing Sheets

PAGING RECEIVER HAVING SELECTIVELY PROTECTED REGIONS OF MEMORY

BACKGROUND OF THE INVENTION

1. Field of the Invention

This invention relates to paging receivers and more particularly to a paging receiver memory having selectively protected regions of memory.

2. Background of the Invention

Communications systems in general and paging systems in particular using transmitting call signals have attained widespread use for calling selected receivers to transmit information from a base station transmitter to the receivers. This information has been transmitted using a number of well known paging coding schemes and message formats, such as POCSAG or Golay coding schemes. Over the past few years, the predominant code transmission schemes used to signal paging receiver devices have changed from sequential tone base systems to formats based on multidigit binary code words, and the services offered to the user have evolved from simple alert only and alert plus voice signalling to more complex multifunction alerting with visual readout of numeric and alphanumeric data. Modern paging systems and paging receivers in particular have achieved multifunction capability through the use of microcomputers which allow the paging receiver to respond to information having various combinations of tone, tone and voice, or data messages. Coupled with the increased use of microcomputers in paging receivers has been the ability to use semiconductor memory to increase the storage capability of the paging receivers to recall data messages at a later time.

In the operation of such paging receivers, important factors involved in their operation have been the portability of the receiver, the size of the paging receiver, the cost of manufacturing the paging receiver, the limited energy available for the paging receiver, the limited availability of the radio spectrum, the fast response time required in today's activity, and the number of paging receivers included in the paging system. In such paging receivers, in order that the drain on the battery be minimized and to increase battery life, the paging receiver is systematically turned off and turned on to maximize the length of time energy is available from the battery. This is typically known as battery saving. Increasing the battery life is highly desirable for commercial marketability, thus operating the paging receiver in a limited energy environment becomes a necessity. The limited energy in which the paging receiver must operate constrains the type of electronic circuitry available for such paging receivers.

In addition, the paging systems that support the operation of paging devices have grown from small on-site in one city systems to very large wide-area systems that can cover most of the state or even an entire nation as evidenced by nationwide paging systems used in Europe. Further, the coding systems used in binary base signalling systems have evolved very rapidly as shown by the recent proposed plans to increase the bit rate for the standard POCSAG code from the transmission rate of 512 bits per second to 1200 bits per second.

The rapid pace of technology change in the paging industry has made the efficient operation of paging systems a very difficult task. A paging system operator often discovers that the paging receivers that were purchased last year do not have all the features provided by units purchased this year, or worse yet, the two sets of paging receivers require two different, and sometimes, incompatible signalling systems. As a result, many paging systems use a mixture of paging receivers and signalling schemes, and the system transmits a time multiplex signalling pattern that might consist of a lengthy sequence of six tone sequential paging codes, followed by a lengthy sequence of POCSAG tone only binary paging codes, followed by a sequence of numeric display signals transmitted in accordance with the Motorola Golay sequential code signalling format.

This mixture of code signalling formats, receiver device models, and device features causes operational problems in terms of system capacity, user queue time, and system flexibility as well as increased cost and problems associated with the repairing and maintaining a large number of different paging receiver models. It has also made it very difficult to add new features and enhancements to the system because of the incompatibility with the older units which cannot be discarded or obsoleted because of the initial capital investment.

A solution to this problem is to provide reprogramming for the paging receiver to allow the reconfiguration of the paging receiver to respond to different signalling formats and to provide greater feature capabilities of the paging receiver. The reconfiguring of the paging receiver falls into two types. First is factory reconfiguration in which the paging receiver is reprogrammed at the factory site or local service site. However, this type of reconfiguring ceases once the paging receiver leaves the factory or service area. A very simple example of factory programming is shown in U.S. Pat. No. 4,422,071 by DeGraaf. DeGraaf illustrates how to program the address code at the factory site.

The second type of reconfiguring is known as over-the-air programming. This type of reconfiguring is beneficial after the paging receiver is acquired by the user. The over-the-air programming of a paging receiver has been described in U.S. patent application Ser. No. 07/116,948 filed 06/11/87, having inventors Davis et al., and assigned to the assignee of the present application. The application describes a paging receiver in which the receiver can be modified by over-the-air commands. In particular, the paging receiver can be totally reconfigured via over-the-air commands and data transmission in terms of the signalling system it can decode and the features and options it can provide. The new selective call paging receiver is flexible enough to provide for a total change of the signalling system and correspondingly the operating characteristics of all the receivers operating within the system as well as providing the means for changing the features and options in any subset of the selectable paging receiver units.

In manufacturing these paging receivers, it is highly desirable to program the address and operating options into a nonvolatile memory offering in-system erase and reprogram capabilities. An example of such a reprogrammable memory is an Electrically Erasable PROM (EEPROM). An EEPROM allows the memory to be electrically erased and reprogrammed. This combination is well suited to a paging receiver operating environment.

In a paging receiver, the address and/or the options can then be modified without replacing the memory unit as was required with prior "one-time" programmable-address code plugs. From the manufacturing standpoint, it is highly desirable to provide for address code and options reprogrammability and over-the-air programming with one EEPROM unit. However, Applicants have discovered that this could allow for the inadvertent modification of data that was not meant to be modified included in the EEPROM. The inadvertent modification of data in the EEPROM was caused either by the reception of error in the signals or by the loss of program control in the microcomputer decoder typically used in these complex paging receivers. Therefore, it has become highly desirable to provide a single EEPROM unit that provides reprogrammable address and options and over-the-air programming in selected regions of the memory, but protects data programmed into a protected region of the EEPROM from inadvertent modification.

SUMMARY OF THE INVENTION

It is therefore an object of the present invention to overcome the problems of the prior art paging receivers having EEPROM memory by providing a device to selectively protect a region of the EEPROM memory from inadvertent modification.

It is another object of the present invention to provide a means for selectively reconfiguring a memory region in a paging receiver at the factory or service site.

It is another object of the present invention to provide a means for reconfiguring a selected region of memory in a paging receiver by "over-the-air" programming.

It is yet another object of the present invention to allow modification for a selected region of memory while prohibiting modification to the remaining regions of memory.

These as well as other objects and advantageous features of the present invention will be apparent in part pointed out hereinafter.

In general, a paging device in one form of the invention has a receiving means, a decoding means, a memory means, a selecting means, a comparing means, and a protecting means. The receiving means receives selective call signals transmitted from an external source. The selective call signals include information intended for reconfiguring a selected region of memory in the paging device. Selective call signals further include coded information, the coded information including a coded signal to permit reconfiguration of the paging device. The decoding means, being responsive to the receiving means, decodes the selective call signals to recover the reconfiguration information and the coded signal. The selecting means selects a region of the memory corresponding to the reconfiguration information. The memory means is responsive to the decoding means for storing the reconfiguration information. The comparing means compares the received coded signal to a predetermined coded signal stored in the paging device to determine the equality of the two signals. The protecting means prevents the selected region of memory from being modified by the decoding means with the received configuration information unless the received coded signal matches the predetermined coded signal stored in the paging device.

Also in general, in another form of the invention, a paging device has a receiving means, a decoding means, a memory means, a selecting means, a sensing means, and a protecting means. The receiving means receives signals transmitted from an external source, the signals including information intended for reconfiguring the paging device. The decoding means recovers the reconfiguration information in the signals. The selecting means selects a region of memory to be reprogrammed by the received reconfiguration information. A sensing means senses an externally applied unlock signal to the paging receiver. The protecting means prevents the selected region of memory from being modified by the received reconfiguration information unless the unlock signal is detected.

In a third embodiment of the invention, a switch means allows a selected region of memory to be modified in response to an unlock signal. However, the switch means prevents other regions of the memory from being modified even if the unlock signal remains activated.

BRIEF DESCRIPTION OF THE DRAWINGS

For the purposes of illustrating the invention, there is shown in the drawings an embodiment which is presently preferred, it being understood, however, that the invention is not limited to the precise arrangement and instrumentality shown.

DETAILED DESCRIPTION OF THE PREFERRED EMBODIMENT

In order to best illustrate the utility of the present invention, it is described in conjunction with a communication receiver, such as a paging receiver, capable of receiving, decoding, and storing transmitted information in a memory of the paging receiver. While the present invention is described hereinafter with particular reference to a paging receiver, it is to be understood at the outset of the description which follows it is contemplated the apparatus and method, in accordance with the present invention, may be used with numerous other communication receivers.

Figure 1:
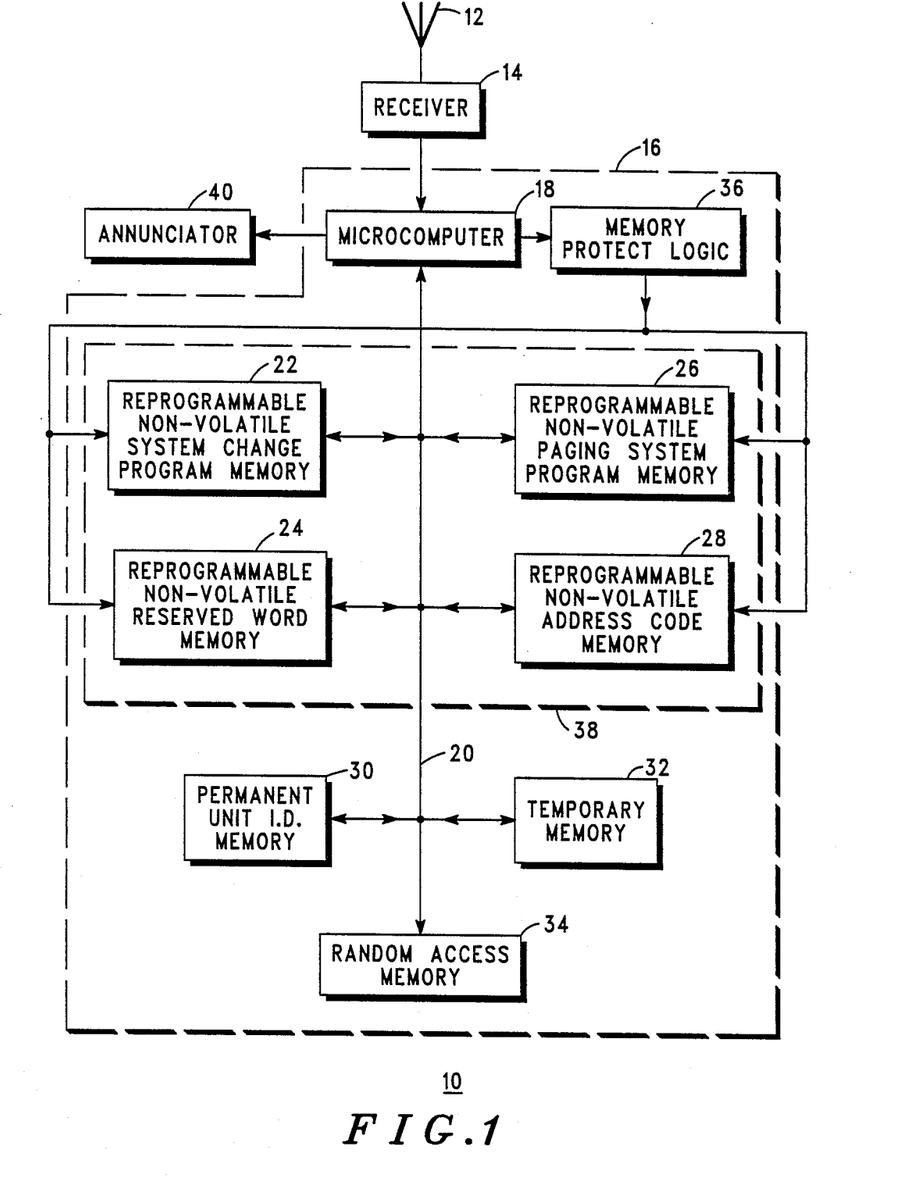
FIG. 1 is a functional block diagram of a paging receiver employing the present invention which is capable of being reconfigured by signals received over a radio frequency communication link and at a factory site.

FIG. 1 is a functional block diagram of the paging receiver 10 employing the present invention. An antenna 12 is shown coupled to a receiver 14. Receiver 14 detects and demodulates signals transmitted from a remote location over a radio frequency communication link. In operation, receiver 14 may use any of a number of frequency tuning techniques including crystal channel elements or digitally synthesized frequency dividers and employ any of a number of modulation/demodulation formats including amplitude modulation and frequency modulation. For the purposes of the present invention, it is easiest to treat the receiver 14 as a well known frequency modulated (FM) receiver which includes channel elements to accurately tune and detect frequency modulated information. However, any number of types of other receivers may be used for generating an appropriately detected RF signal for analysis. The output of receiver 14 is coupled to an analysis and decoding system block 16 shown enclosed by broken lines. More particularly, the output of receiver 14 is coupled to a microcomputer controller 18. While the term microcomputer is utilized, it will be appreciated by those skilled in the art that a number of custom program logic circuits could be utilized to achieve the same controlling function such as a program array logic. For the purpose of describing the preferred embodiment, the implementation of the paging receiver device employing the invention will be by firmware stored in a memory portion of the microcomputer based controller. Microcomputer 18 includes a common bus line designated 20 which is used to couple it to a variety of additional devices. Any of a number of microcomputers would be suitable, but a preferred device is an MC146805E2 or MC68HCO5 microcomputer manufactured by Motorola, Inc.

It is understood that microcomputer 18 has its own internal clock as is well known in the art for controlling its internal operation as well as its interfacing with other elements of unit 16. In particular, microcomputer 18 is coupled through common bus line 20 to a reprogrammable nonvolatile system change program memory 22, a reprogrammable nonvolatile reserve word memory 24, a permanent receiver unit identification memory 30, a reprogrammable nonvolatile receiver system program memory 26, a temporary memory 32, a reprogrammable nonvolatile address code memory 28, and a random access memory 34. Microcomputer 18 is also coupled to a memory protect logic element 36 containing programming control logic which in turn is coupled to reprogrammable paging system program memory 26, reprogrammable address code memory 28, reprogrammable system change program memory 22, and reprogrammable reserve word memory 24. It is understood that reprogrammable memories 22, 24, 26 and 28 are included in one programmable memory unit such as an EEPROM illustrated by broken line 38. Any of a number of memories would be suitable, but a preferred device is an X24C16 2K×8 Serial EEPROM manufactured by Xicor. In addition, microcomputer 18 is coupled to an annunciator 40 to generate an alerting sequence to inform the user upon receipt of a message. While the term annunciator is used, it is intended that such devicfe may audible, visual, tactile, or any combination of such stimulus devices to inform the user of the receipt and/or content of the message. Paging system program memory 26 is adapted to store the instructions which microcomputer 18 executes to detect or recognize input signals from receiver 14 to process the signals including decoding and to appropoiately store the process signal in designated areas of random access memory 34. The data decoded and processed by the microcomputer 18 is stored in designated areas of RAM 34, depending upon the nature of the data.

The output of receiver 14 is coupled to microcomputer controller 18 which controls the overall decoding operation for whichever message and coding format is used at any given time. The function of the microcomputer 18 is to take the selective call message information from receiver 14 and process it according to a predetermined coding format. Regardless of the coding system, a microcomputer 18 may be used as the main decoding tool. For the preferred embodiment, it is convenient to presume further that the paging receiver is an FSK receiver and the microcomputer 18 takes the derived binary digit levels from the discriminator output portion of receiver 14 and processes them according to a predetermined digital word decoding format.

In normal operation, the microcomputer 18 is responsive to the information contained in the system program memory 26 and executes signalling decoding algorithms contained therein. System program memory 26 contains all the software information needed to allow the microcomputer to process and decode information encoded according to a predetermined signalling format. Reprogrammable nonvolatile address code memory 28 is used to store the address code sequences that uniquely identify a receiving device and information to designated characteristics and features, and reprogrammable nonvolatile reserve memory 24 is used to store address code sequences associated with a change in the address or options of the individual receiving unit or signalling system. In operation, microcomputer 18 compares received signal sequences with the sequences stored in memories 24 and 28 to determine whether the selective call signals and addressed individual units have been received or if a system or unit change command has been received. When a selective call signal is detected, the microcomputer responds in a normal manner according to the information contained in address code memory 28 to activate annunciator 40 and alert the paging unit a message has been received. The sequence of operation is well known in the art and U.S. Pat. No. 4,518,961 describes such a microcomputer system.

When a system or unit change command signal is received, the microcomputer responds by storing the new data in the temporary memory 32 and transferring the data to the appropriate nonvolatile memory. Address code memory 28 is more commonly referred to as the code plug and such a device is included with most paging receivers to carry information as to the specific address or addresses of selective call units and they also contain such things as information determining the alerting sequence mode or other features that are initiated upon receipt and detection of an address of the individual receiving unit. Temporary memory 32 is used to provide for the reliable reprogramming of the paging receiving device. As will be discussed in greater detail later, memory protect logic device 36, under control of microcomputer controller 18, is used for accessing the nonvolatile memories 22, 24, 26 or 28 for the purpose of reprogramming them with data stored in temporary memory 32.

When predetermined sequences of the control signals contained in address code memory 28 and reserve word memory 24 are received, the microcomputer 18 begins to execute the instructions contained in the system change program memory 22 and decodes subsequent data transmissions as defined in the signalling format. The data is first stored in temporary memory 32 and is then transferred into memory 22, 24, 26, or 28 after the correctness and completeness of the data has been verified. A permanent unit I.D. memory 30 is provided so that regardless of the status or utilization of any paging code format, the receiver always has an identifiable permanent address.

Upon receipt of predetermined reserve word signals which correspond to the information contained in reserve system word memory 24, and which can be arbitrarily represented in a decoding system, microcomputer 18 begins executing the program and instructions contained in system change program memory 22 to process subsequent data transmissions. These data, which are transmitted in the format of the paging code currently being broadcast, constitute the new program instructions to be used to decode a new signalling format or new information record memory 28. In this operating mode, microcomputer 18 loads the received data in temporary memory 32, then checks the data for errors, and loads the data into the appropriate nonvolatile memories. The data that represent the instructions for decoding the new signalling system are programmed into the paging system memory 26, the data corresponding to the new system change instructions are programmed into the system program memory 22, and the data corresponding to the new reserve word signals are programmed into reserve word memory 24. Finally, the new address signals for the unit are derived from the permanent unit I.D. memory using an algorithm contained in the transmitted data and the new address signals are programmed into address code memory 28. As will be described, if only the information in code memory 28 effecting the address features or options of the device are to be reconfigured, an algorithm need not be transmitted; rather, new information may be transmitted directly.

The reconfiguring of the various nonvolatile memories of the decoder is accomplished by means of the memory protect logic 36. In particular, the microcomputer 18 directs the memory protect logic 36 to set up a specific memory for reprogramming and then sequentially inputs the data to the selected memory via bus 20. The protect logic 36 acts to enable the programming mode of the particular memory and further prepares the memory to receive the new data into specified regions of the selected memory. The precise details of the programming the nonvolatile memory device are discussed with reference to FIG. 2.

While the operating system control word memory 24 is shown as a distinct memory, it is clear to those skilled in the art that may be distributed in several locations, including paging system memory 26 and address code memory 28. Indeed, all of the memories 22-28 shown in FIG. 1 could be physically incorporated into one memory device 38 such as the EEPROM.

Before the activation of any change of programming of paging code formats from one decoding system to another, there must be some checking operation to insure that new information now stored in temporary memory 32 is free from errors. Once the microcomputer controller determines that the receiver information is correct utilizing error correction techniques, it causes a transfer of the information from the temporary memory 32 into the various reprogrammable memories, thus eliminating the past paging code format and replacing it with new paging code format. When the information to reprogram the receiver device is transmitted over the air, an obvious concern is how one prevents transmission errors so that the receiver device can properly execute the desired reprogram procedures, and the new decoding procedures will operate correctly. Among the several well known ways of achieving this is to transmit the new program information as encoded data and rely on the receiver device to employ some digital error correction algorithm and assume the error corrected program data is correct. There would be some limit on the maximum number of correctable errors, but this technique is widely used to achieve error free data transmission. A second way is to transmit the new paging code format program several times while having the receiver device stored in new data as temporary memory. Transfer to the reprogram code information into a paging system program memory 26 occurs only after it has been verified by multiple receptions of identical data. A third method is to transmit the data several times with error correction algorithms and have the receiving device evaluate the received data information and repeat the decoding process only for that portion of the transmission that appears to be in error. All of the three suggested error correcting techniques are well known in the art (see, for example, "Error Control Techniques for Digital Communication", Arnold Michaelson and Allen Levesque, 1985, John Wiley & Son), and any of them may be used effectively.

The final step of the system change procedure outlined above involves a derivation of new address signals from the permanent unit I.D. memory. Here the information is stored in the I.D. memory as processed in accordance with the transmitted algorithm to derive the address signal assigned to that unit and the new signalling system. In the preferred embodiment, the unit I.D. information is stored as a binary sequence, and the algorithm used to derive the new address signal is a binary transformation algorithm that might consist of multiplying the binary unit I.D. number by 1 or more binary sequences to obtain a new encoded address signal. The procedures for accomplishing such unit I.D. to signal code word transformation are well known in the art, and the mathematical details of the transformation procedure are not presented here.

Figure 2:
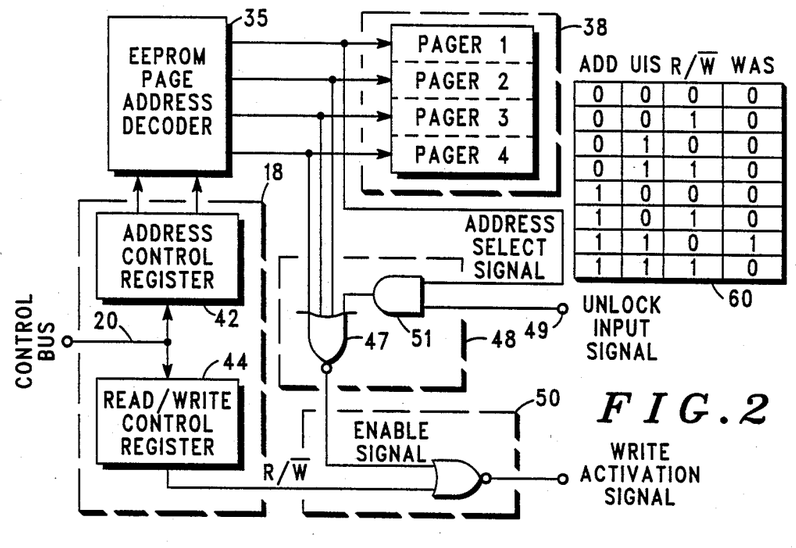
FIG. 2 illustrates a detailed block diagram of the protect unit for preventing inadvertent modification of a selected region of memory at the factory.

Referring now to FIG. 2, there is shown a first embodiment of the present invention for a "hardware-protect" feature that protects a selected portion or page of nonvolatile memory 38. The memory protect logic 36 includes a select means 35, an enabling means 48, and an activating means 50. A sensing means, such as a protect pin 49, being accessible from the outside of the paging receiver is coupled to the protect logic 36. When a positive supply voltage is applied to the protect pin 49, the positive supply voltage causes to be generated by the memory protect logic 36 a write activation signal which allows the microprocessor to write within a selected region or page of memory. The ability to write into a memory upon activating a write signal is well known to those of ordinary skill, and the discussion of such is not presented here.

While the illustrated example is explained with reference to protecting a particular region of memory 38, such as page one, it is understood that other pages of memory can be selected for protection. As illustrated, enabling means 48 may be hardwired so as to select one of a plurality of regions of memory 38. For example, enabling means 48, as illustrated in FIG. 2, selects page one of memory 38. However, it is understood that reconfiguring hardware jumpers allows other pages of memory 38 to be selected as described hereinafter. For instance, if page 2 is to be protected, the address select signal for page 2 is interchanged with the address select signal of page 1. It is further understood that each page may contain either the reprogrammable nonvolatile system change memory 22, the reprogrammable nonvolatile reserved word memory 24, the reprogrammable nonvolatile paging system program memory, or the reprogrammable nonvolatile address code memory.

Referring further to memory protect logic, the enabling means 48 for the preferred embodiment includes an AND gate 51 and a NOR gate 47. Inputs to the enabling means 48 include address select signals generated by the select means 35 such as an address decoder 46 in a manner well known in the art. An unlock signal is generated by positive supply voltage being applied to a sensing means, such as the protect pin 49, accessible from the outside of the paging receiver. The protect pin 49 being accessible from the outside of the paging receiver allows, in the manufacturing process, an electrical interconnect to be applied to the paging receiver so that the protect region of memory 38 can be programmed or reprogrammed in the factory or at a service site. The output (illustrated as an enable signal) from the enabling means 48 is applied as an input to the activation means 50. Another input to activating means 50 is a read-write signal generated by microcomputer 18 in a manner well known in the art. The activating means 50 generates a write activation signal which is applied to memory 38 to enable microcomputer 18 to write within a selected area of memory 38. NOR gate 47 permits other unprotected areas of memory 38 to be written to in a normal manner.

In operation, the microcomputer 18 via control bus 20 loads an address to write into in a memory address control register 42. At the same time, a read-write control register 44 is loaded and generates a write control signal in a manner well known in the art. The address decoder 35 being responsive to the address control register 42 generates address select signals for selecting one of the areas of memory to be accessed by the microprocessor.

In the illustrated example, the protected area of memory 38 is shown as page one. To write into page one, an address select signal is generated by address decoder 35 to enable the microprocessor to access page one. The enabling means 48 intercepts the address select signal and applies it to one input of AND gate 51. The second input to AND gate 51 is the unlock signal from protect pin 49. In response to the address select signal being activated and the unlock input signal being activated, the AND gate 51 generates an output signal applied to NOR gate 47. NOR gate 47 generates an enable signal which is applied to one input of activating means 50. The second input to activating means 50 is the read-write control signal output from the read-write control register 44. The activating means in the presence of an enable signal and a write signal generates the write activation signal.

In FIG. 2, the read-write control signal is illustrated as being a write signal at a "low" level and a read signal at a "high" level. Thus, the write signal is activated when control signal at input 54 is low. When the enable signal and the read-write control signal is detected at activating means 50, the write activation signal is generated. Please note that the write activation signal is enabled when a high level signal is generated at output 58. The write activation signal is applied to memory 38 to allow the microprocessor 18 to write into the protected area of memory 38.

The operation of memory protect logic 36 is illustrated by truth table 60. As is shown, when the microprocessor 18 selects page one and simultaneously generates the write control signal, and a positive supply voltage is applied to the unlock input signal, the memory protect logic 36 generates a write activation signal to allow microcomputer 18 to write into page one of memory 38. However, if the address select signal is absent, the unlock input signal is absent or the write control signal is absent, the write activation signal is not generated. Thus, a selected region of memory 38 cannot be modified unless a positive supply voltage is applied to the protect pin. This embodiment is particularly useful in the manufacturing and service process wherein an interconnect feature attached to the protect pin and supplying a positive voltage to the protect pin allows the protected region to be programmed or reconfigured.

Figure 3:
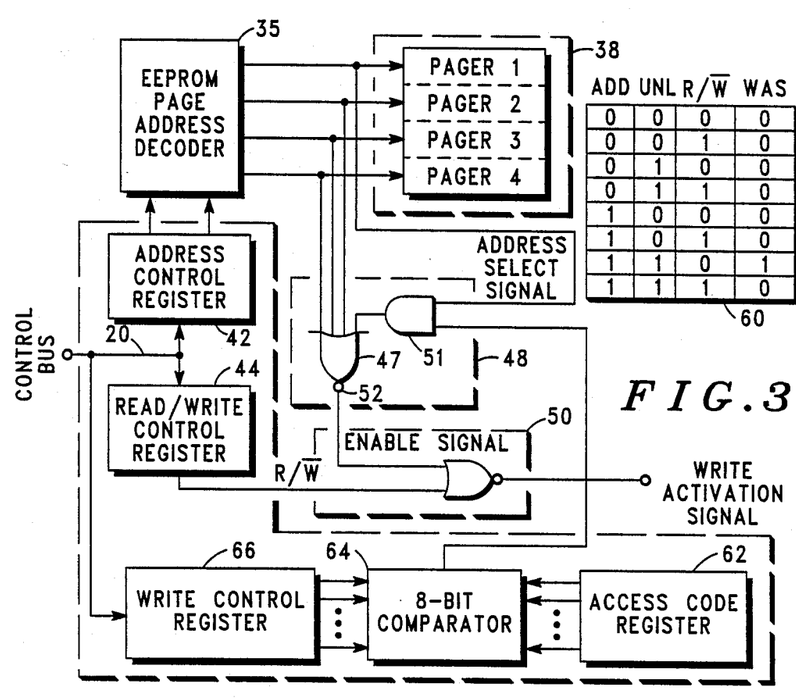
FIG. 3 shows a detailed block diagram of the protect unit for allowing over-the-air reconfiguration of a selected region of memory.

Referring to FIG. 3, there is shown a second embodiment of the present invention. In this embodiment, the protected region of memory is controlled by the contents of an access code register 62. The access code register 62 may be included in the permanent unit I.D. memory 30. The access code register 62 provides a predetermined code word which must match the code word loaded into a write control register 66 by microcomputer 18. The code word loaded into the write control register 66 is typically decoded by the microcomputer from received paging information. That is, selective call signals including reconfiguration information and the code word are transmitted from the base station transmitter. Upon detecting the code word, the microcomputer is notified that the received information is reconfiguration information intended to be stored in a selected region of memory. If the predetermined code word in access code register 62 is equal to the code word in the write control register 66, a comparison means 64 such as an 8 bit comparator generates the unlock signal as discussed with reference to FIG. 2 to enable microcomputer 18 to access memory 38.

In operation, the microcomputer 18 must load the correct code word in write control register 66 to allow the microcomputer to write to a protected area of memory 38. If the code word loaded in the write control register is not equal to the code word contained in the access code register, the 8 bit comparator does not generate the unlock signal and the memory protect logic 36 does not allow the microcomputer 18 to write to the selected area of memory 38. However, if the code words are equal, the memory protect logic operates as discussed with reference to FIG. 2 to allow the microcomputer to access the selected region of memory. As discussed with reference to FIG. 2, the selected area may be any one of pages 1-4, depending upon the jumper wires within enabling means 48.

While the unlock signal is necessary to write into the protected area of memory 38, the unlock signal is not necessary for microcomputer 18 to write into other unprotected areas of memory 38. Thus, the ability to write over or modify the contents of the protected region of memory is controlled by the contents of the access code register. A predetermined code word must be loaded into the write control register to unlock the protect feature and allow modification of the protected memory area. The code word loaded into the write control register can be derived in any number of well known ways including being transmitted to the paging receiver for allowing over-the-air modification of certain protected paging receiver features and options.

Figure 4:
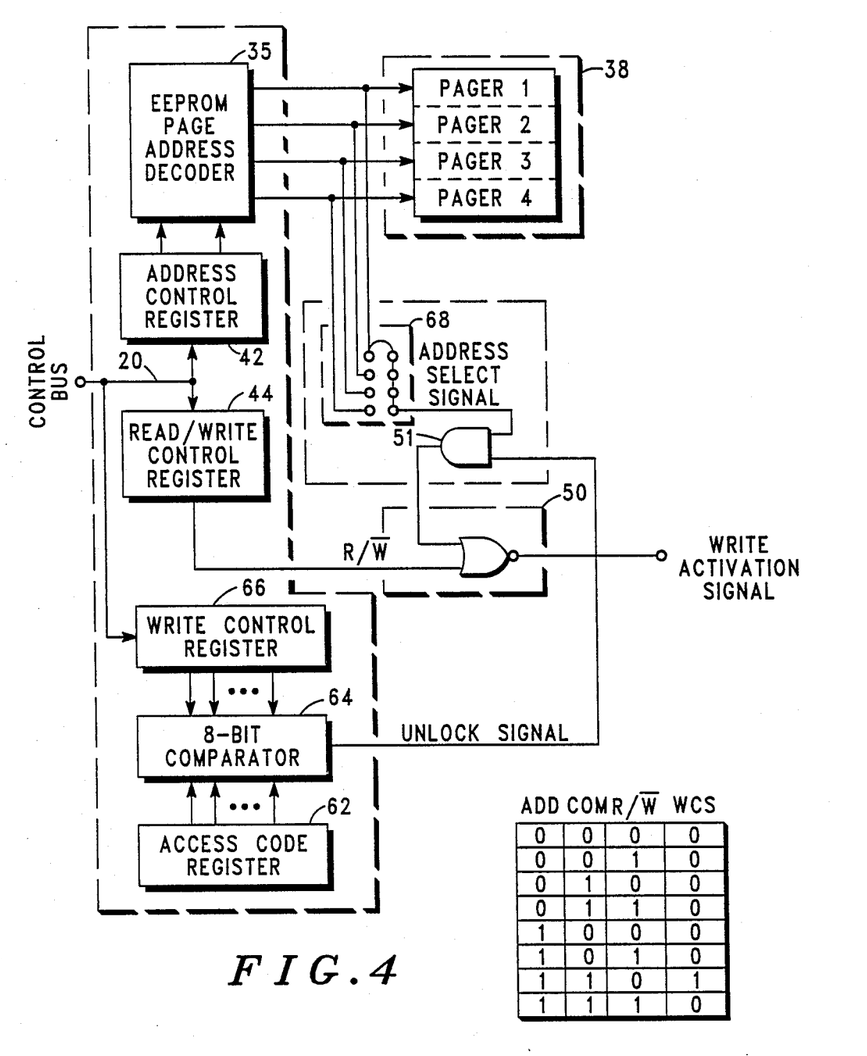
FIG. 4 shows a block diagram of the protect unit for allowing only a selected region of memory to be modified while preventing modification to other regions of memory.

Referring to FIG. 4, there is shown a third embodiment of the present invention. In this embodiment, a selected region of memory is protected unless an unlock signal is sensed, while other unselected regions of memory are prevented from being modified. Referring to FIG. 4, enable means 48 now includes a switch means 68 and an NAND gate 69. The switch means 68 replaces the NOR gate 47 as shown in FIGS. 2 and 3, and the NAND gate 69 replaces functionally the AND gate 51 and NOR gate 47. Switch 68 includes a plurality of jumpers which allows electrical communication to be achieved between AND gate 51 and any of one of the address select lines of address decoder 35. In operation, switch 68 allows any one of the select address signals from decoder 35 to be applied to the input of NAND gate 69. The output from NAND gate 69 is applied to the input of NOR gate 50. In operation, the select signal from one of the regions of memory 38 is applied to the NAND gate 69 to generate the write activation signal as explained previously with reference to FIGS. 2 and 3. However, any of the other select signals are prevented from being applied to NOR gate 50 to prevent activation of the write activation signal. Thus, when microcomputer 18 desires to modify one of the regions of memory 38, the lock signal and address select signal must be applied to NAND gate 69. However, other regions of memory are prevented from being modified since the select signals are terminated within switch 68.

Thus, there has been shown a method and apparatus for allowing both protected and unprotected data to be stored in one EEPROM. In the first embodiment, by applying a positive voltage to the "protect" pin, the microcomputer of the paging receiver can read and write to the EEPROM in a normal manner. In the second embodiment, a coded entry must be received or generated by microcomputer 18 to allow microcomputer 18 to write to the protected memory region. In a third embodiment, a method is illustrated for permitting only a selected portion of memory to be modified in response to an unlock signal. Other portions of the memory are prevented from being modified.

There has heretofore been described the best embodiment of the invention presently contemplated. However, it is to be understood that various changes and modifications may be made thereto without departing from the spirit of the invention.

What is claimed is:

1. A paging device comprising:
   means for receiving selective call signals transmitted from an external source, the selective call signals including an address to which the paging device is responsive, information intended for reconfiguring the operation of the paging device and coded information, the coded information including a coded signal to allow reconfiguring the operation of the paging device;
   means for decoding the selective call signals to recover the reconfiguration information and coded signal in response to decoding said address;
   memory means, having a temporary memory region and nonvolatile memory regions, said nonvolatile memory regions being readable for controlling the operation of the paging device, said memory means being responsive to said decoding means for temporarily storing said reconfiguration information in said temporary memory region;
   means for selecting a nonvolatile region of memory corresponding to said information to be reconfigured;
   means for comparing the received coded signal to a predetermined coded signal stored in the paging device; and
   means for protecting said selected nonvolatile region of memory from being modified by said decoding means with said temporarily stored reconfiguration information, said protecting means being responsive to said comparing means to prevent said selected nonvolatile region of memory from being modified unless the received coded signal matches the predetermined coded signal.

2. The paging device of claim 1 wherein said nonvolatile memory regions comprises an EEPROM capable of being partitioned into selected regions of memory.

3. The paging device of claim 1 wherein said comparing means generates an unlock signal in response to said received coded signal matching said predetermined coded signal;
   said selecting means generates a select signal corresponding to the selected nonvolatile region of memory;
   said decoding means generate a write control signal to access said nonvolatile region of memory; and
   further wherein said protecting means being responsive to the unlock signal, said write control signal, and the select signal, generates a write activation signal to permit said decoder to modify the selected nonvolatile region of memory.

4. The paging device of claim 3 wherein said protect means comprises:
   an enabling means being responsive to the unlock signal and the select signal for generating an enable signal in response thereof; and
   an activating means being responsive to the enable signal and the control signal for generating the write activation signal in response thereof.

5. The paging device of claim 2 wherein the predetermined code signal comprises a binary word and the received coded signal comprises an identical binary word.

6. The paging device of claim 5 wherein said comparing means is a digital comparator for generating the unlock signal in response to comparing two identical binary words.

7. The paging device of claim 1 wherein said decoding means comprises a microcomputer being responsive to said receiving means for producing further signals to control access to said memory means.

8. The paging device of claim 7 wherein said microcomputer controls the operation of the paging device according to a predetermined set of instructions stored in said nonvolatile regions of said memory means.

9. The paging device of claim 8 wherein the reconfiguration information includes a new set of instructions to replace the previous set of instructions stored in said nonvolatile regions of said memory means to reconfigure the paging device.

10. A method for protecting a selected region of memory in a paging receiver, the selected region being a nonvolatile memory region for storing information readable for controlling the operation of the paging receiver, said method comprising the steps of:
    (a) receiving selective call signals transmitted from an external source, the selective call signals including an address to which the paging receiver is responsive, information intended for reconfiguring the operation of the paging device and coded information, the coded information including a coded signal to allow reconfiguration of the operation of the paging device;
    (b) decoding the selective call signals to recover the reconfiguration information and coded signal in response to decoding said address, and temporarily storing the same;
    (c) selecting the nonvolatile region of memory having information corresponding to the reconfiguration information;

(d) comparing the received coded signal to a predetermined coded signal stored in the paging device; and (e) Protecting the selected nonvolatile region of memory from being modified by the temporarily stored reconfiguration information unless the predetermined coded signal matches the received code signal.

11. The method of claim 10 wherein step (e) of protecting further includes:
(f) generating an unlock signal in response to said received coded signal matching said predetermined coded signal;
(g) generating a select signal corresponding to the selected nonvolatile region of memory;
(h) generating a write control signal for accessing said nonvolatile region of memory; and
(i) modifying the selected nonvolatile region of memory in response to the unlock signal, write control signal, and select signal.

12. The method of claim 10 wherein said nonvolatile memory regions comprise an EEPROM and further wherein step (c) of selecting further comprises:
(j) dividing the EEPROM into a plurality of selectable areas, each area containing different information; and
(k) selecting an area of the EEPROM corresponding to the received reconfiguration information.

13. A method for protecting a selected region of memory in a paging receiver using an externally applied unlock signal, the selected region being a nonvolatile memory region for storing information readable for controlling the operation of the paging receiver, said method comprising the steps of:
(a) receiving selective call signals transmitted from an external source, the selective call signals including an address to which the paging receiver is responsive, information intended for reconfiguring the operation of the paging device;
(b) decoding the selective call signals to recover the reconfiguration information in response to decoding said address and temporarily storing the same;
(c) selecting the nonvolatile region of memory having information corresponding to reconfiguring information;
(d) sensing the externally applied unlock signal to the paging device; and
(e) protecting the selected nonvolatile region of memory from being modified by the temporarily stored reconfiguration information unless the presence of the unlock signal is detected.

14. The method of claim 10 wherein step (e) of protecting further includes:
(f) generating a write control signal by the decoding means for accessing said nonvolatile region of memory; and
(h) modifying the selected nonvolatile region of memory in response to the externally applied unlock signal, write control signal, and select signal.

15. A paging device having reconfigurable device operations using an externally applied lock signal, said device comprising:
means for receiving signals transmitted from an external source, the signals including an address to which the paging device is responsive and information intended for reconfiguring the operation of the paging device;

means for decoding the the signals to recover the reconfiguration information in response to decoding said address;
memory means, having a temporary memory region and nonvolatile memory regions, said nonvolatile memory regions being readable for controlling the operation of the paging device, said memory means being responsive to said decoding means for temporarily storing the reconfiguration information in said temporary memory region;
means for selecting a nonvolatile region of memory containing said information to be reconfigured;
means for sensing the externally applied unlock signal to the paging device; and
means for protecting the selected nonvolatile region of memory from being modified by the temporarily stored reconfiguration information, said protect means being responsive to the unlock signal to prevent the selected nonvolatile region of memory from being modified unless the unlock signal is detected.

16. The paging device of claim 15 wherein said nonvolatile memory regions comprises an EEPROM capable of being partitioned into selected regions of memory.

17. The paging device of claim 15 wherein said selecting means generates a select signal corresponding to the selected nonvolatile region of memory;
said decoding means generates a write control signal to access said nonvolatile region of memory;
and further wherein said protecting means being responsive to said unlock signal, said write control signal, said select signal, generates a write activation signal to allow said decoder to modify the selected nonvolatile region of memory.

18. The paging device of claim 17 wherein said protect means comprises:
an enabling means being responsive to said unlock signal and said select signal for generating an enable signal in response thereof; and
an activating means being responsive to said enable signal and said control signal to generate said write activation signal in response thereof.

19. A paging device comprising:
means for receiving signals transmitted from an external source, the signals including an address to which the paging device is responsive and information intended for reconfiguring the operation of the paging device;
means for decoding the signals to recover the reconfiguration information in response to decoding said address;
memory means, having a temporary memory region and nonvolatile memory region, said nonvolatile memory regions being readable for controlling the operation of the paging device, said memory means being responsive to said decoding means for temporarily storing the reconfiguration information in said temporary memory region, said memory means capable of being partitioned into selected regions of nonvolatile memory;
means for sensing an unlock signal; and
means for permitting the selected region of nonvolatile memory to be modified by the temporarily stored reconfiguration information in response to said unlock signal, wherein said means for permitting prevents unselected regions of nonvolatile memory from being modified.

20. The paging device of claim 19 wherein said nonvolatile memory regions is comprised of an EEPROM.

21. The paging device of claim 19 wherein said unlock signal is externally applied.

22. The paging device of claim 19 wherein said unlock signal is generated by comparing a received coded signal to a predetermined coded signal stored in the paging device.

23. A paging device comprising:

means for receiving signals transmitted from an external source, the signals including an address to which the paging device is responsive and information intended for reconfiguring the operation of the paging device;

means for decoding the signals to recover the reconfiguration information in response to decoding said address;

memory means, having a temporary memory region and nonvolatile memory regions, said nonvolatile memory regions being readable for controlling the operation of the paging device, said memory means being responsive to said decoding means for temporarily storing the reconfiguration information in said temporary memory region;

means for selecting a nonvolatile region of memory containing information to be reconfigured;

means for sensing an unlock signal to the paging device; and means for protecting the selected nonvolatile region of memory from being modified by the temporarily stored reconfiguration information unless the unlock signal is detected, wherein said protecting means further allows unselected nonvolatile regions of memory to be modified independent of detecting the unlock signal.

24. The paging device of claim 23 wherein said nonvolatile memory regions comprises an EEPROM capable of being partitioned into selected regions of memory.

25. The paging device of claim 23 wherein said unlock signal is externally applied to the paging device.

26. The paging device of claim 23 wherein said unlock signal is generated when a predetermined coded signal stored in the paging device matches a received coded signal.

* * * * *